March 18, 1924.
J. H. WENTWORTH
DOORKNOB
Filed July 28, 1920
1,487,496
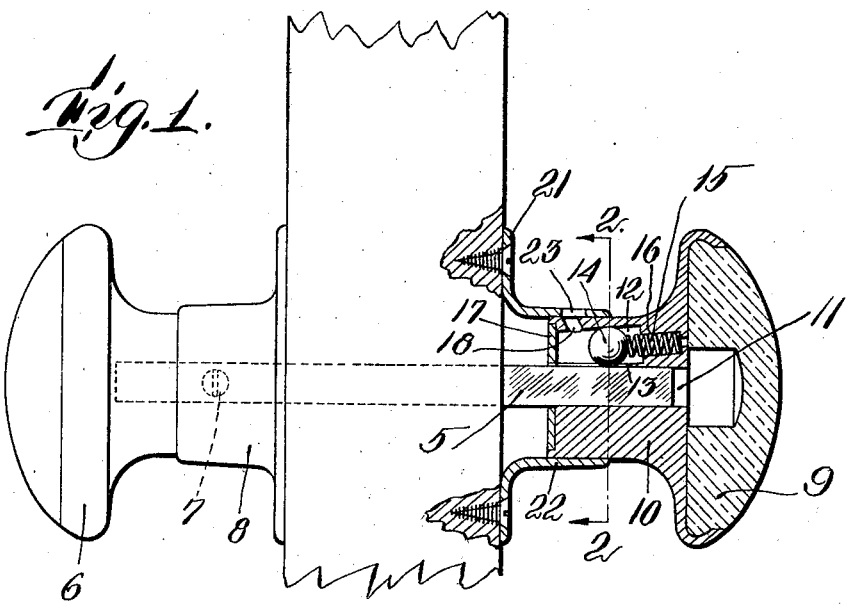
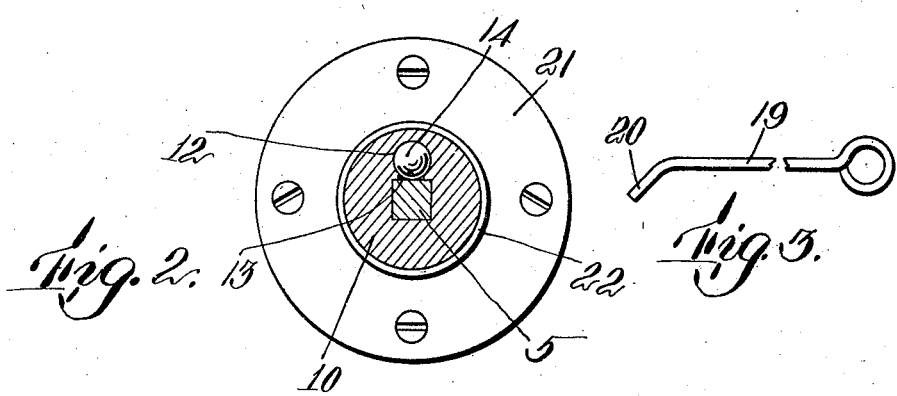
Inventor:
James H. Wentworth Patented Mar. 18, 1924.

1,487,496

UNITED STATES PATENT OFFICE.

JAMES H. WENTWORTH, OF LYNN, MASSACHUSETTS.

DOORKNOB.

Application filed July 28, 1920. Serial No. 399,562.

*To all whom it may concern:*

Be it known that I, JAMES H. WENTWORTH, a citizen of the United States, residing at Lynn, in the county of Essex and State of Massachusetts, have invented new and useful Improvements in Doorknobs, of which the following is a specification.

This invention has for its object to provide a door knob which may be locked to the spindle without the use of screws or other fastenings, and which is capable of minute adjustment to fit a door of any thickness within reasonable limits. This object is accomplished in the present case by providing the shank of the knob with an inclined guideway in which a spring-pressed ball is located in such position as to engage the spindle and lock the knob thereon. The shank, however, is furnished with a lateral aperture through which a spirally formed implement may be inserted for pressing back the ball and releasing the knob.

On the accompanying drawing—

Figure 1 illustrates a door equipped with a knob embodying the present invention, the knob and associated escutcheon being shown in section.

Figure 2 represents a section on the line 2—2 of Figure 1.

Figure 3 illustrates an implement for releasing the knob.

The spindle 5, which is rectangular in cross section, has secured to one end a knob 6 by any suitable means. The connection may be permanent, or, if desired, the parts may be connected by a screw 7 concealed by the escutcheon 8, which in such case is on the inside face of the door.

The knob 9, which is to be locked to the spindle, may be made of any suitable materials, and its shank 10, is furnished with a bore 11 complemental to the spindle so that the latter will have a nice sliding fit therein. A cylindrical bore forming a guideway 12 is formed in the shank, at a wedging angle to the axis thereof, so that there is a narrow tapering opening 13 connecting the guideway and the bore, through which a ball 14 may project into engagement with the spindle, when the ball approaches the outer end of the guideway under the pressure of a coiled spring 15 seated in a socket 16 at the end of the guideway. Any suitable means, e. g., a plate 17 may be located and secured at the end of the shank, to prevent the dislocation of the ball 14, when the knob is removed from the shank. The ball, with the described arrangement of the parts, acts, of course, as a clutch to lock the knob and the spindle together, and while it permits the knob to be adjusted toward the door, to any desired extent, prevents the knob from being moved toward the end of the spindle. The ball, of course, is greater in diameter than the width of the throat 13.

As it becomes necessary to remove the spindle some times to permit repair of the bolt mechanism with which it is associated, I provide for the release of the knob from the spindle. To this end, the shank has a lateral aperture 18, communicating with the guideway, near the end thereof, so that an implement 19, such as shown in Figure 3, and having a bent end 20 may be inserted therein so as to force the ball toward the inner end of the guideway and thus disengage it from the spindle.

An escutcheon 21 having an elongated annulus or bearing 22, sufficient in length to receive the end of the shank, is employed, and it has a slot 23, with which the aperture 19 normally does not register, but the two may be brought into registration by slightly rotating the knob. While the aperture 19, slot 23 and the ball 14 are shown as located above the shank, I ordinarily locate them below it, so that the slot and aperture are normally concealed or hidden.

I am aware that it has heretofore been proposed to employ concealed sharpened pawls or dogs for biting into the metal of the shank, and thereby securing a knob to a spindle, but those are unsatisfactory as they do not prevent lost motion and do not permit the removal of the knob when necessary. Spring-pressed jaws adapted to engage teeth formed on the interior of the shank are unsatisfactory, since they too do not permit of the firm adjustment that is frequently necessary to adapt the knobs to a door. I am aware also that a ball clutch, per se, is not new, but, so far as I am aware, the combination expressed in the appended claim is novel with me.

What I claim is:—

The combination of a spindle, a knob having a bore in its shank into which said spindle telescopes, and also having a guideway inclined with respect to and communicating with said bore, and a spring-pressed ball located in said guideway and projecting into said bore to lock the knob to said spindle, said shank having an aperture communicating with said guideway, through which an implement may be passed for pressing back the ball and releasing the knob in combination with an escutcheon having an aperture normally out of register with said first mentioned aperture with which said first mentioned aperture may be brought into registration.

In testimony whereof I have affixed my signature.

JAMES H. WENTWORTH.